United States Patent [19]

Palmer

[11] Patent Number: 4,517,923
[45] Date of Patent: May 21, 1985

[54] ANIMAL FEEDING SYSTEM

[75] Inventor: Tom Palmer, Louisville, Ky.

[73] Assignee: Key Systems, Inc., Louisville, Ky.

[21] Appl. No.: 511,528

[22] Filed: Jul. 7, 1983

[51] Int. Cl.³ .............................................. A01K 5/02
[52] U.S. Cl. ................................................ 119/51 R
[58] Field of Search ................................... 119/51 R

[56] References Cited

U.S. PATENT DOCUMENTS

| 3,557,758 | 1/1971 | Lack | 119/51 R |
| 3,929,277 | 12/1975 | Byrne et al. | 119/51 R X |
| 4,049,950 | 9/1977 | Byrne et al. | 119/51 R X |
| 4,288,856 | 9/1981 | Linseth | 119/51 R X |
| 4,350,118 | 9/1982 | Ostler | 119/51 R |
| 4,350,119 | 9/1982 | Ostler | 119/51 R |
| 4,463,353 | 7/1984 | Kuzara | 119/51 R X |

FOREIGN PATENT DOCUMENTS 1577023  10/1980  United Kingdom ............ 119/51 R

Primary Examiner—Hugh R. Chamblee
Attorney, Agent, or Firm—Donald L. Cox

[57] ABSTRACT

There is disclosed an animal feeding system which comprises a means for collecting and storing information regarding an animal's individual characteristics such as milk production or weight, a means for storing information regarding the desired or predicted animal characteristics, means for comparing the desired or predicted characteristics and the individual characteristics and determining the degree of variance between the two, and means for feeding the animal based upon the variance, including a means for identifying the particular animal which is at a feed station and means for providing feed to the animal in a user definable, predetermined relationship to the variance.

13 Claims, 1 Drawing Figure

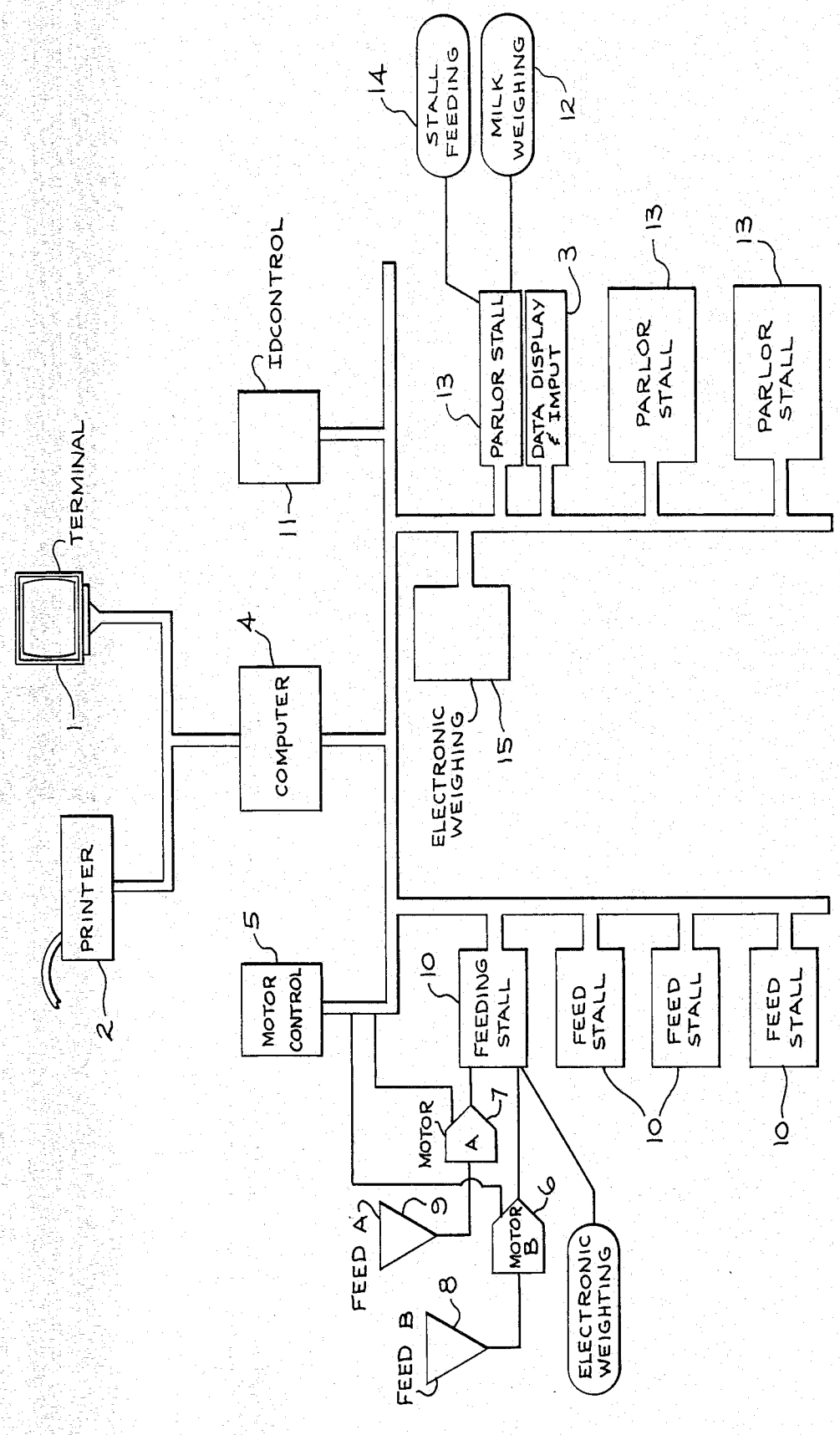

4,517,923

ANIMAL FEEDING SYSTEM

BACKGROUND OF INVENTION

This invention relates to systems for feeding animals based upon stored computer information. More particularly, this invention relates to methods for feeding individual animals which are dependent upon the animal's own individual performance in relation to the desired performance of the animal.

In the prior art, various computerized animal feeding systems have been described. For example, in U.S. Pat. No. 3,788,278, there is provided a method for feeding animals based upon some particular physical characteristic of the animal, and feeding is adjusted based upon this measured physical characteristic. However, no provision is made for monitoring the amount of feed consumed by the animal and adjusting this amount in relation to a predetermined mathematical formula. U.S. Pat. No. 4,049,950 discloses an apparatus for determining and registering the amount of food consumed by animals, so that a predetermined amount of food is consumed by the animal each day. However, this patent does not provide a method for adjusting the amount of food to be consumed by the animals based upon predicted or desired performance goals of the animal or for changing the amount of food to accomplish these performance goals. U.S. Pat. No. 3,557,757 discloses that cows may be fed based upon an external mathematical formula such as the animal's place in a theoretical feed cycle. However, no provision is made for adjusting feeding based upon the actual performance of the animal or the amount of food consumed as compared to the feed cycle. In other words, each animal at the same point in a feed cycle is fed the same amount of food regardless of the performance of that animal.

The device in U.S. Pat. No. 3,929,277 simply monitors the amount of food consumed by an animal, but does not make any adjustments based upon an external program.

U.S. Pat. No. 3,541,995 identifies particular animals which are at a feed station and discharges feed to the animal based upon a predetermined program. The inventors recognize that many factors influence the milk production of an animal and suggest that feeding be individualized according to where the cow is in her lactating cycle. However, the device disclosed in the patent does not make adjustments in the amount of food provided based upon an animal's individual characteristics during a lactating cycle.

Accordingly, it is an object of this invention to develop a reliable, cost effective, individual animal feeding system which allows animals efficiently to be fed.

It is another object of this invention to provide a system which feeds animals based upon the animal's performance in relation to desired performance goals. The system should provide a minimum amount of computer entries and should allow for management of animals which have not eaten their allocated ration. As a result, profits on the sale of the animals will be increased.

SUMMARY OF INVENTION

The instant invention involves a system for feeding animals which in essence adjusts the amount of feed provided to the animal based upon a feed consumption prediction formula generally used for the animal and upon the animal's previous performance in comparison to the formula. The instant invention comprises a means for collecting and storing information regarding individual animal characteristics, such as weight or milk production, a means for storing information regarding desired or predicted characteristics, means for comparing and determining the variance between the desired or predicted characteristics and the animal's individual characteristics, and means for feeding the animal based on the variance, including means for identifying the animal and means for providing food to the animal in predetermined relationship to the variance.

DETAILED DESCRIPTION OF DRAWINGS

FIG. 1 is a block diagram of one version of the feeding system of the instant invention.

As shown, a terminal 1 is provided for inputting information into the computer 4 and for reading out data from the computer. Operating in conjunction with the terminal is a printer 2 which can print out information displayed on the terminal. More than one terminal may be employed in the invention to input information or to obtain displays of information from the computer. For example, in the parlor stall where individual cows are milked, data display and input terminals may also be provided to allow obtaining and feeding information into the system directly from the stall area. The computer involved is a general purpose, digital computer programmed using conventional techniques to store and process information as further described herein. Information from the computer is utilized to control motors via motor control means 5 which provide amounts of feed as described hereafter. A single motor 6 used alone or in combination with one or more additional motors 7 may be used to provide various types of feed 8 and 9 to a feeding stall 10. As many as 48 feeding stalls may be employed.

Also operating in conjunction with the computer is an identification control means 11, which operates in conjunction with animal identification means attached to the feeding stalls and to the parlor stalls, and, if utilized, to the separate electronic weighing areas. These identification means provide specific information about the various parameters relating to individual animals and are responsive to machine readable identification tags which are attached to each animal. Information relating to animals is provided in one instance by milk weighing means 12, located in parlor stalls 13. These weighing means detect the amount of milk that has been produced by a particular cow and provide this information to the memory of the computer. Alternatively, information concerning needed feed may be supplied from the computer to allow stall feeding, as shown in block 14, utilizing the same procedures as are employed when a separate feeding stall is utilized.

Finally, animals may be weighed either in the parlor stalls, in the feeding stalls, or in separate electronic weighing areas, as shown in block 15. This information, as with information regarding milk production, is fed into the computer and stored in the computer's memory.

DETAILED DESCRIPTION OF INVENTION

There are several important components to the system of this invention which provides a method for feeding a group of individual animals, with each individual animal receiving an individually tailored ration of food.

The first component of the instant invention is an identification tag which may automatically be read so as to differentiate each animal from every other animal in the animal grouping or herd. The type of tag is not important; however, the tag must permit ready automatic reading and identification of the particular animal which has arrived at a feeding station. For example, the tag may be a print card, radio transmitter, magnetic device, or the like. Generally, any type of tag which may be machine read and which identifies a particular animal from every other animal will function within the scope of this invention. The most preferred are machine readable magnetic types which are attached to the neck of an animal. As the animal inserts its head into the feeding device, the information encoded on the tag is read by a magnetic reader.

The identification tag reader which is provided within each of the feeding stations acts to read the information from the identification tag so as to identify the particular animal which has arrived at the feeding station. By using this device, any animal may eat at any of the feeding stations designated by the user and yet be provided with its own individualized portion of food.

Each feeding station is equipped with a means for providing a set amount of food to the animal, depending upon the amount the system determines an individual animal should consume. There are many well known methods for automatically dispensing the required amount of food to an individual animal. For example, a screw extruder type food dispenser may be employed which provides a set amount of food for each screw turn. In using this device, the number of turns of the food extruder screw is in direct proportion to the amount of food provided.

The food provision means may be equipped with a vibrator or other means for preventing the food from caking or agglomerating during periods when the device is not in use. Where foods with high moisture content, such as undried corn, are employed, additional mechanical agitation means for preventing the food from agglomerating or caking may be employed.

In addition to employing feed stations which provide a single set amount of food to an animal, feed stations equipped with multiple feeding heads or other means for providing blends or mixtures of various types of feeds may also be provided. In one instance, a hopper is provided with two separate sections for storing two different types of food. In this instance, a screw extruder is attached to each of the hopper sections, so as to separately control the amount of each type of food provided for the animal. When this type of multiple food dispenser is provided, it is possible not only to vary the overall amount of food, but also to vary the ratio of the different types of food which is provided to the animal.

The period of time over which the food is dispensed may be varied by the user. For example, instead of simply dispensing the day's ration of food at one time, the user may elect to divide the day up into, for example, eight periods, and provide one-eighth of the daily ration during each of these eight feeding periods. By providing an increased number of feeding cycles per day, it is assured that the animal will not overeat at a single feeding session. In addition, the amount of food provided during the multiple daily feeding periods may vary, depending upon the time of day, or other factors, so that non-uniform amounts of food are provided over a twenty-four hour period.

The computer involved is a general purpose, digital computer. The computer has random access memory, read only memory and a non-volatile memory area. The non-volatile memory area can either be disk, bubble memory, or other suitable media. Included in the machine is a clock to assist with the real-time functions being performed. In addition, communications lines are provided to communicate with terminals, printer(s), and the necessary equipment to provide and receive data. Important information may be protected from power outage by one of two methods:

1. Periodic checkpoint records written to the non-volatile memory.
2. Battery backup system which turns on automatically when the power goes or becomes corrupt.

The computer keeps track of the amount of food consumed by the animal during any particular period of time. In addition, the computer assures that the animal consumes only the desired amount of food, thereby conserving the amount of food consumed. For example, if an animal has already been dispensed its required amount of food, no further feed will be dispensed to that animal if it arrives at a feed station.

In addition, the animal feeding system may be equipped with means for monitoring breeding information, such as heat dates, times bred, sire information, expected calving dates, and expected dry dates. This information is then randomly accessible by the user to provide information to aid in the management of the herd.

In addition to information concerning the amount of food consumed by each animal, an individual animal variable, such as milk production, weight or the like, is measured and entered in the system. The entry may be accomplished either manually or in an automatic fashion. In manual operation the animal is weighed periodically on a scale, the information is recorded, and then entered through an appropriate terminal into the system. If milk production is the desired individual animal characteristic, a measure of the animal's milk production is manually recorded and entered through a terminal into the system. Automatic, closed loop functioning of the system involves automatically measuring an animal's milk production and periodically feeding that information into the system. Automatic weighing may be accomplished by providing an electromagnetic scale at some commonly accessible location and periodically measuring the weight of the animal.

The final input to the system is information concerning a predicted or desired animal characteristic and the relationship between food consumption and this characteristic. For example, the computer may be programmed with a predicted food consumption table based upon the animal's lactating cycle. In this curve, milk production based on the cow's lactating cycle is graphed versus food consumption. In another example, a weight/food consumed table is fed into the computer to provide a relationship between the maximum desired weight gain for beef cattle and the amount of food needed to provide that weight gain.

The instant invention involves an improvement on the basic idea of feeding a cow in accordance with its predicted weight yield or milk yield. As information concerning food consumption, personal animal characteristics, and predicted animal characteristics is collected, the personal animal characteristic is compared with the predicted animal characteristic. In the event a variance is observed, the amount of food provided to the animal is adjusted to overcome the variance. For example, when the computer is used as a method of providing the optimum food for milk cows, the cow's milk production per unit of food produced is compared with the predicted production. If milk production is lower, the amount of food may be changed in accordance with user input tables provided in the system. In addition, the user can specify that the computer challenge feed any or all animals. This procedure involves providing the animal with a gradually increasing amount of food and then periodically or continuously measuring milk output. Under this system, as long as the animal produces additional milk, additional food will be provided. However, when milk production levels off, no additional increases in food amounts are allowed.

Weight gain may be treated in the same fashion. The cow's actual weight gain is compared with predicted weight gain. As pointed out above, weight gain may be measured continuously or at various intervals. The amount of weight gain is then compared with the predicted weight gain and the system is adjusted to provide only the optimum amount of food necessary to provide the desired weight gain. In other words, heavier growing animals tend to require more food than growing animals which weigh less. By making the adjustments allowed in the system, a user may provide less food to those animals which do not need as much food to grow as do heavier animals.

In addition, the system may be equipped with a means for lead feeding an animal immediately before she calves. By employing this process, a cow is prepared for the birth of the calf and the coming lactation by gradually increasing, according to predefined formulae, the amount of food that the cow receives to prepare her for lactation. Like the other feeding systems of this invention, the cow's predicted performance is compared with actual performance. In this case, information concerning the cow's performance on her prior lactation is present in the computer for analysis and for comparison with predicted curves. Based upon a comparison of this information, an adjustment in the cow's feeding is made, so as to gradually lead her into her lactation period.

In addition, the system of the instant invention allows automatic monitoring and adjustment of feeding, depending upon whether a cow is in her dry or in her lactating cycle. Most dairy farms separate dry cows from cows which are in their milk-producing cycle. In this alternative process, feeders are provided in both the dry lot and the milk-producing lot. When the computer senses that an animal which was in the lactating lot has appeared in the dry lot, the computer first determines whether the animal has appeared in the dry lot at a time near its expected dry date by analyzing the animal's lactating/dry cycle history. If the date of appearance in the dry lot is in relatively close proximity to the predicted dry date, then the computer begins feeding the animal according to the desired dry feeding cycle. In the event there is a substantial variance between the date of the appearance of the animal in the dry lot and its predicted date of appearance there, the computer informs the farmer of this fact.

When the cow moves in the opposite direction using this alternative embodiment, the computer, upon sensing that the cow has moved into the milk-producing area, adjusts the cow's predicted lactating curve, based upon mature equivalency data and her previous lactation curve, to produce a new predicted lactation curve. This curve in then, as pointed out above, compared with actual lactation periodically over the lactation term, and the curve is adjusted depending upon actual lactation performance.

By using this computer it is possible to provide the optimum, minimum amount of food to produce the desired animal characteristic, such as milk production or weight gain.

The adjustments referred to herein may be made on any convenient time basis, including daily or weekly.

In addition, the system will also identify those animals which have not eaten the full amount of food provided during any time period, so that the farmer can identify those animals which might be ill or incapacitated.

What is claimed is:

1. A system for feeding animals including means for identifying individual animals and computer control means for providing individualized amounts of a feed to animals comprising means for collecting information concerning an animal's weight, means for storing information relating to an animal's weight, means for storing a weight gain curve relating to an animals' predicted weight gain over a weight gain cycle, means for comparing the information about the weight gain curve over the weight gain cycle with information regarding the animal's actual weight gain and for determining the variance between actual weight gain and predicted weight gain according to the curve and means for feeding the animal based on said variance.

2. The system of claim 1 wherein the weight gain curve is updated periodically.

3. A system for feeding animals including means for identifying individual animals and computer control means for providing individualized amounts of a feed to animals comprising means for collecting information concerning an animal's milk production, means for storing information relating to an animal's milk production, means for storing a milk production curve relating to an animals' predicted milk production, means for comparing the information about the milk production curve over the milk production cycle with information regarding the animal's actual milk production and for determining the variance between actual milk production and milk production according to the curve and means for feeding the animal based on said variance.

4. The system of claim 3 wherein the milk production curve is updated periodically.

5. The system of claim 3 wherein the means for feeding the animal includes a means for determining whether the animal is in a dry or wet cycle and for adjusting the food in acordance with this information.

6. The system of claims 1 or 3 wherein the means for identifying animals includes an individual animal identification tag which is machine readable.

7. The system of claim 6 wherein the identification tag is magnetic.

8. The system of claim 1 or 3 wherein the means for feeding the animal based on said variance includes an animal feed station provided with a screw extruder for providing the food.

9. The system of claim 8 wherein the animal feed station is provided with multiple screw extruders for providing different types of food.

10. The system of claim 1 or 3 in combination with a means for storing information relating to the breeding characteristics of the animal.

11. The system of claims 1 or 3 wherein weight gain or milk production information is automatically collected and stored in the system.

12. The system of claims 1 or 3 wherein the means for feeding the animal includes a means for lead feeding the animal.

13. The system of claims 1 or 3 wherein the means for feeding the animal includes a means for challenge feeding the animal.

* * * * *